US012520403B2

(12) United States Patent
Jagmag et al.

(10) Patent No.: US 12,520,403 B2
(45) Date of Patent: Jan. 6, 2026

(54) LIGHTING DEVICE WITH AUDIO SIGNAL CONTROL FEATURE

(71) Applicant: Roku, Inc., San Jose, CA (US)

(72) Inventors: Adil Jagmag, Hollis, NH (US); Johan Gerard Willem Maria Janssen, Morgan Hill, CA (US); Sharada Palasamudram Ashok Kumar, Sunnyvale, CA (US); Sunil Ramesh, Cupertino, CA (US); Michael Cutter, Golden, CO (US); Shashank C. Merchant, Sunnyvale, CA (US); Yu-Cheng Lin, Golden, CO (US)

(73) Assignee: Roku, Inc., San Jose, CA (US)

( * ) Notice: Subject to any disclaimer, the term of this patent is extended or adjusted under 35 U.S.C. 154(b) by 175 days.

(21) Appl. No.: 18/327,199

(22) Filed: Jun. 1, 2023

(65) Prior Publication Data

US 2024/0407065 A1 Dec. 5, 2024

(51) Int. Cl.

| | |
|---|---|
| ***H05B 47/105*** | (2020.01) |
| ***G10L 19/018*** | (2013.01) |
| ***H04R 1/02*** | (2006.01) |

(52) U.S. Cl.

CPC .......... *H05B 47/105* (2020.01); *G10L 19/018* (2013.01); *H04R 1/028* (2013.01)

(58) Field of Classification Search

None

See application file for complete search history.

(56) References Cited

U.S. PATENT DOCUMENTS

| | | | | |
|---|---|---|---|---|
| 7,797,542 | B2 | 9/2010 | Tachibana | |
| 10,764,230 | B2 | 9/2020 | Lord | |
| 12,317,388 | B1 * | 5/2025 | Dhanapalan | H05B 47/155 |
| 2005/0234728 | A1 | 10/2005 | Tachibana | |
| 2017/0188437 | A1 * | 6/2017 | Banta | G10L 15/22 |
| 2018/0144755 | A1 | 5/2018 | Lee | |
| 2023/0389162 | A1 * | 11/2023 | Heemstra | H05B 47/115 |

* cited by examiner

*Primary Examiner* — Kenneth B Wells

(74) *Attorney, Agent, or Firm* — McDonnell Boehnen Hulbert & Berghoff LLP

(57) ABSTRACT

In one aspect, disclosed is an example method for use by a lighting device including a microphone and a light source, the method including: (i) receiving, by the lighting device via the microphone, an audio signal; (ii) decoding and extracting, by the lighting device, a lighting device control instruction from the received audio signal; and (iii) using, by the lighting device, at least the decoded and extracted lighting device control instruction as a basis to control operation of the light source.

21 Claims, 6 Drawing Sheets

LIGHTING DEVICE WITH AUDIO SIGNAL CONTROL FEATURE

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method is for use in connection with a lighting device comprising a microphone and a light source, the method comprising (i) obtaining a lighting device control instruction associated with the lighting device; (ii) encoding the obtained lighting device control instruction into an audio signal; and (iii) outputting the encoded audio signal into an environment in which the lighting device is located, the lighting device being configured for (a) receiving, via the microphone of the lighting device, the outputted audio signal, (b) decoding and extracting the lighting device control instruction from the received audio signal, and (c) using at least the decoded and extracted lighting device control instruction as a basis to control operation of the light source.

In another aspect, an example computing system is disclosed. The computing system comprises a processor and is configured for performing a set of acts for use in connection with a lighting device comprising a microphone and a light source, the set of acts comprising (i) obtaining a lighting device control instruction associated with the lighting device; (ii) encoding the obtained lighting device control instruction into an audio signal; and (iii) outputting the encoded audio signal into an environment in which the lighting device is located, the lighting device being configured for (a) receiving, via the microphone of the lighting device, the outputted audio signal, (b) decoding and extracting the lighting device control instruction from the received audio signal, and (c) using at least the decoded and extracted lighting device control instruction as a basis to control operation of the light source.

In another aspect, a non-transitory computer-readable medium is disclosed. The medium has stored thereon program instructions that upon execution by a processor of a computing system, cause performance of a set of acts for use in connection with a lighting device comprising a microphone and a light source, the set of acts comprising (i) obtaining a lighting device control instruction associated with the lighting device; (ii) encoding the obtained lighting device control instruction into an audio signal; and (iii) outputting the encoded audio signal into an environment in which the lighting device is located, the lighting device being configured for (a) receiving, via the microphone of the lighting device, the outputted audio signal, (b) decoding and extracting the lighting device control instruction from the received audio signal, and (c) using at least the decoded and extracted lighting device control instruction as a basis to control operation of the light source.

In another aspect, an example method is disclosed. The method is for use by a lighting device comprising a microphone and a light source, the method comprising: (i) receiving, by the lighting device via the microphone, an audio signal; (ii) decoding and extracting, by the lighting device, a lighting device control instruction from the received audio signal; and (iii) using, by the lighting device, at least the decoded and extracted lighting device control instruction as a basis to control operation of the light source.

In another aspect, an example lighting device is disclosed. The lighting device comprises a microphone and a light source, and is configured to perform a set of acts comprising: (i) receiving, by the lighting device via the microphone, an audio signal; (ii) decoding and extracting, by the lighting device, a lighting device control instruction from the received audio signal; and (iii) using, by the lighting device, at least the decoded and extracted lighting device control instruction as a basis to control operation of the light source.

In another aspect, a non-transitory computer-readable medium is disclosed. The medium has stored thereon program instructions that upon execution by a processor of a computing system, cause performance of a set of acts for use in connection with a lighting device comprising a microphone and a light source, the set of acts comprising: (i) receiving, by the lighting device via the microphone, an audio signal; (ii) decoding and extracting, by the lighting device, a lighting device control instruction from the received audio signal; and (iii) using, by the lighting device, at least the decoded and extracted lighting device control instruction as a basis to control operation of the light source.

DETAILED DESCRIPTION

I. Overview

Figure 1:
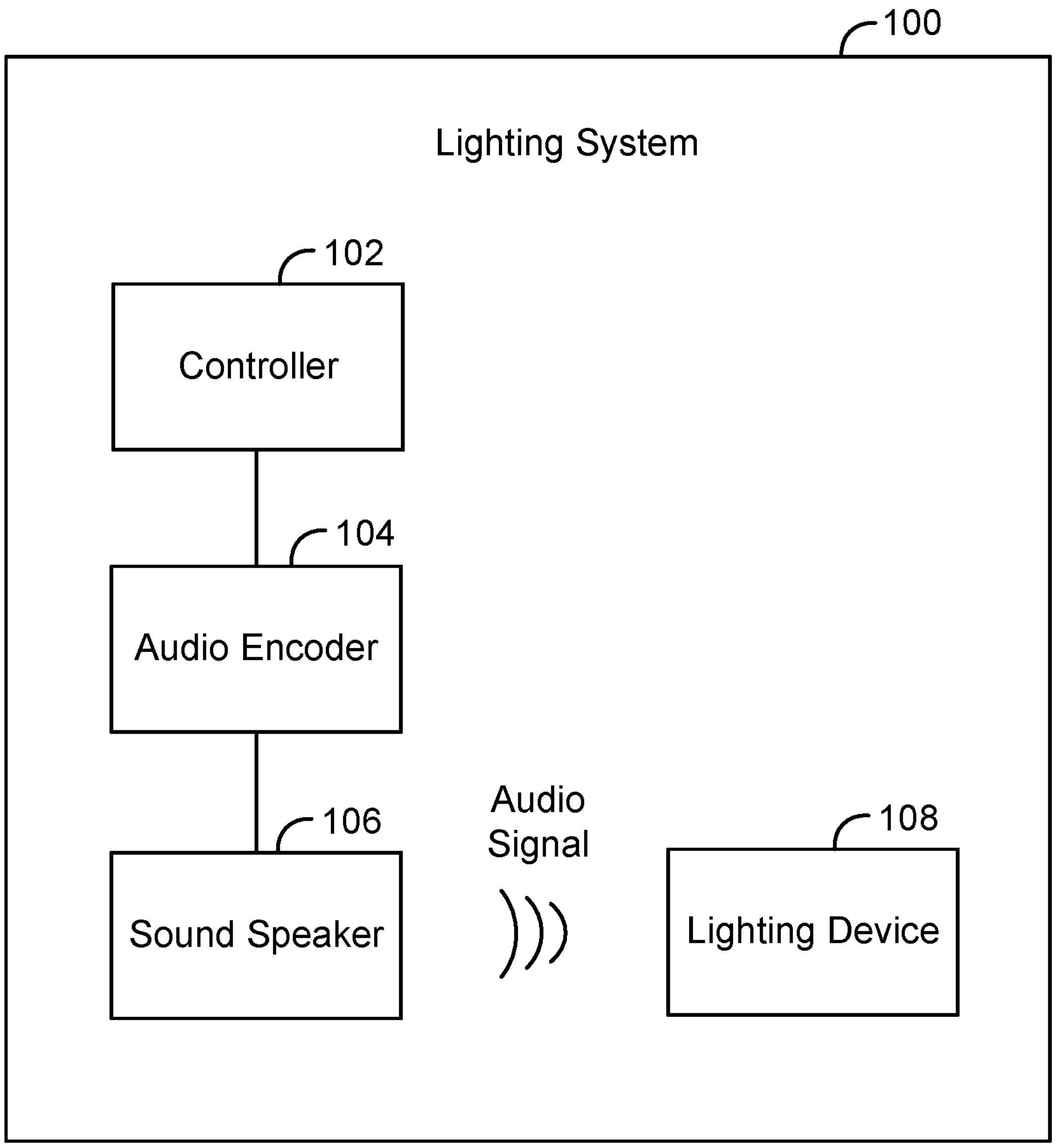
FIG. 1 is a simplified block diagram of an example lighting system in which various described principles can be implemented.

In the context of a network of "smart home" or "Internet of Things" (IoT) devices, a hub device or other controller can control operation of a variety of different devices, such as a light bulb, light strip, or other lighting device. For example, the controller can cause the lighting device to emit light or to control a color or brightness level of the emitted light, among numerous other possibilities.

The controller can control the lighting device in various ways. As one approach, the controller and the lighting device can engage in a Bluetooth, Wi-Fi, or other wireless protocol-based pairing process that involves the devices finding and identifying each other for the purposes of enabling the two devices to communicate with each other via that wireless protocol. In some cases, this can include the controller and/or the lighting device operating in a pairing mode, in which the devices carry out the pairing process based on a given wireless communication protocol, and then switching from the pairing mode to a controlling mode, in which the controller controls operation of the lighting device by transmitting a lighting device control instruction to the lighting device via that wireless communication protocol. As such, with this approach, a controller can control a lighting device over Bluetooth, Wi-Fi, or via some other wireless communication protocol.

However, in some cases, the process of pairing the controller and the lighting device can be time-consuming and/or burdensome for a user. In addition, controlling a lighting device in this manner can sometimes result in latency and/or synchronization issues. Thus, it may be beneficial to be able to control the lighting device in a different way, so as to minimize or avoid at least some of these or other potential issues. Disclosed herein are systems and methods that provide such an alternative approach. In one aspect, disclosed is a lighting system that provides for using an audio signal to control a lighting device. In one aspect, a lighting system can include a controller, an audio encoder, a sound speaker, and a lighting device. Within this arrangement, the controller can obtain a lighting device control instruction associated with the lighting device. Then, the audio encoder can encode the obtained lighting device control instruction into an audio signal, such as by using an audio water marking technique to encode the instruction as a watermark in the audio signal. Next, the sound speaker can output the encoded audio signal into an environment in which the lighting device is located. And the lighting device can then receive, via a microphone, the outputted audio signal, and can decode and extract the lighting device control instruction from the received audio signal. Finally, the lighting device can use at least the decoded and extracted lighting device control instruction as a basis to control operation of the light source.

In one example, the lighting device control instruction can be encoded within a human inaudible frequency range of the audio signal. For instance, the lighting device control instruction can be encoded within a frequency range below around 20 Hz or above around 20 kHz. In this way, the audio signal can be used to control operation of the lighting device without humans nearby being disturbed or distracted by the audio signal. In some cases, the audio signal can be one that is generated solely for the purposes of controlling the lighting device. However, in other examples, the audio encoder can encode the lighting device control instruction into an existing audio signal (e.g., an audio signal including audio content in the form of music or an audio component of video content, such as a television program or movie, for instance). In this way, the lighting device control instruction could be embedded in an existing audio signal that is already being used in connection with outputting audio content in the environment where the lighting device is located. As such, the audio signal that encodes the lightning device control instruction can encode both audio data (representing the audio content) and the lightning device control instruction.

With these and other example techniques disclosed herein, the lighting system can control the lighting device without the need to engage in a pairing process and in a way that is simple and that can go unnoticed by humans who are nearby. Various other features and concepts are discussed in below in greater detail.

II. Example Architecture

A. Content System

FIG. 1 is a simplified block diagram of an example lighting system 100. Generally, the lighting system 100 can perform operations related to lighting, including using an audio signal to control a lighting device.

The lighting system 100 can include various components, such as a controller 102, an audio encoder 104, a sound speaker 106 and/or a lighting device 108. The lighting system 100 can also include one or more connection mechanisms that connect various components within the lighting system 100. For example, the lighting system 100 can include the connection mechanism represented by the line connecting the above-referenced components of the lighting system 100 as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, a communication (e.g., a transmission or receipt of data) can be a direct or indirect communication.

Generally, the controller 102 can be configured to obtain, generate, and/or transmit a lighting device control instruction associated with the lighting device 108. In one example, the controller 102 can obtain the lighting device control instruction by receiving it from a user or a device, and transmit the obtained lighting device control instruction to the audio encoder 104. The controller 102 can take various forms, such as that of a mobile phone, media player, and/or television, among numerous other possibilities.

Generally, the audio encoder 104 can be configured to obtain a lighting device control instruction, encode a lighting device control instruction into an audio signal, and/or transmit an audio signal. In one example, the audio encoder 104 can receive a lighting device control instruction from the controller 102, encode the lighting device control instruction into an audio signal by employing a watermarking technique, and transmit the encoded audio signal to the sound speaker 106. The audio encoder 104 can take various forms. For example, the audio encoder can take the form of an audio watermark encoder, among numerous other possibilities.

Generally, the sound speaker 106 can be configured to obtain and/or output an audio signal. In one example, the sound speaker 106 can obtain an encoded audio signal from the audio encoder 104 and can output the obtained encoded audio signal into an environment in which the lighting device 108 is located. The speaker can take various forms, such as a wall-mountable speaker, a floor standing speaker, a bookshelf speaker, a smart speaker, a sound bar, and/or a speaker integrated into a television set or other media-presentation device, among numerous other possibilities.

Generally, the lighting device 108 can be configured to receive an audio signal, decoded and extract a lighting device control instruction from an audio signal, and/or use a lighting control instruction as a basis to control operation of a light source. In one example, the lighting device 108 can receive, via a microphone of the lighting device, an encoded audio signal output by the sound speaker 106, decode and extract a lighting device control instruction from the received audio signal, and use the decoded and extracted lighting device control instruction to control operation of a light source of the lighting device.

Figure 2:
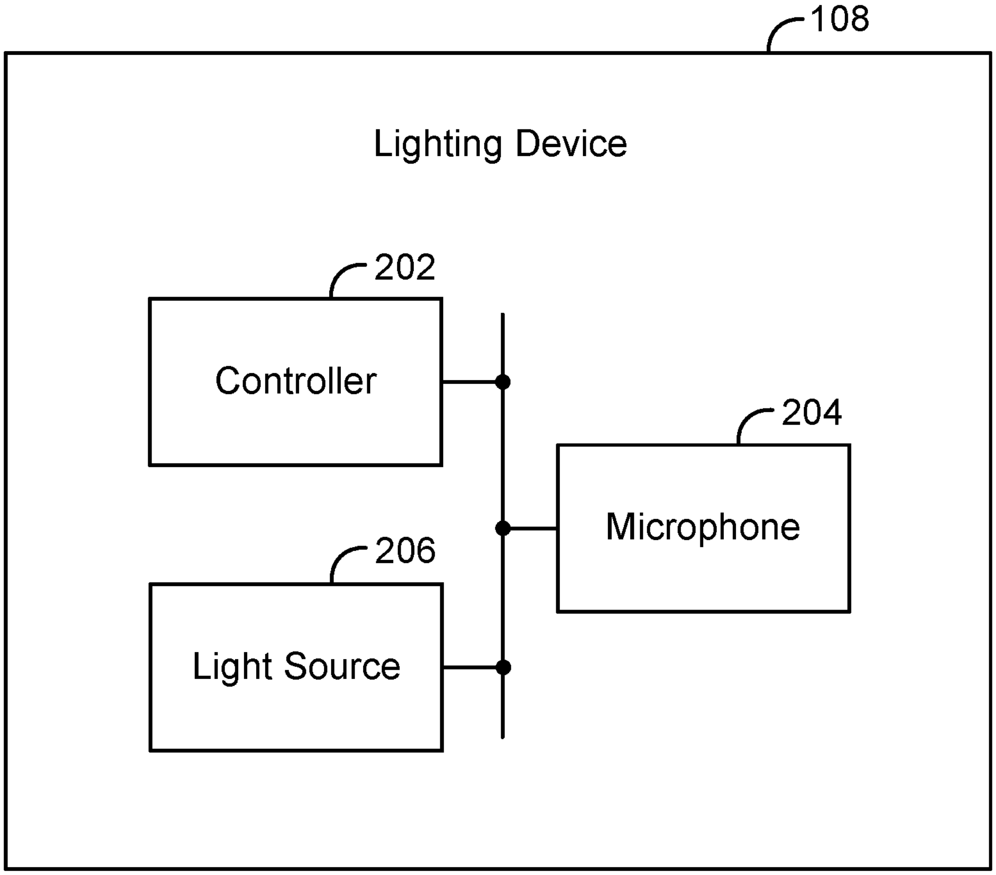
FIG. 2 is a simplified block diagram of an example lighting device in which various described principles can be implemented.

FIG. 2 is a simplified block diagram of an example lighting device 108. The lighting device 108 can include various components, such as a controller 202, a microphone 204, and/or a light source 206. The lighting device 108 can also include one or more connection mechanisms that connect various components within the lighting device 108. For example, the lighting device 108 can include the connection mechanism represented by the line connecting the above-referenced components of the lighting device 108, as shown in FIG. 2.

The controller 202 can control operation of the lighting device 108, such as by processing an audio signal received via the microphone 204 to decode and extract a lighting device control instruction from the audio signal, and by causing the light source 206 to emit light in accordance with the lighting device control instruction. The controller 202 can be implemented as a computing system and can include various components, such as a processor, a data storage unit, a communication interface, and/or controlling circuitry, for example, to carry out such functionality.

The light source 206 can include one or more light sources that can emit light according to one or more lighting parameters. The one or more lighting parameters can relate to various characteristics of the emitted light, including for example an on/off state, a color, and/or a brightness level of the emitted light or a portion thereof, among other possibilities. In some situations, the lighting parameters can include a time-related component such that the controller 202 can cause the light source 206 to emit light with on/off states, colors, levels of brightness, etc. that change over time.

The lighting device 108 (and/or components thereof) can have a variety of different configurations. For example, the lighting device 108 can take the form of a light strip that has a light source in the form of an array of light-emitting diodes (LEDs). Light strips can come in different lengths and/or can have multiple segments that can be connected together and/or detached from each other, to create light strips of different lengths. In some instances, a light strip can be configured such that the light source has multiple regions, each of which can be separately controlled with one or more respective lighting parameters. As such, in one example, a lighting strip could have ten regions, arranged one after another in sequence, where the first region can emit light having a first color, brightness level, etc., the second region can emit light having a second and different color, brightness level, etc., and so on. In some instances, the light strip can be controlled such that different regions emit light in different ways at different times, to create certain lighting effects, such as to simulate light moving from one region to the next, across the light strip, among numerous other possibilities.

The lighting device 108 (and/or components thereof) can come in lots of other configurations as well. For example, the lighting device 108 could take the form of a light bulb, light bar, and/or a string of lights, among numerous other possibilities. Some or all of these may share some of the characteristics described above in connection with light strips (e.g., having multiple controllable regions of light, for example) and/or have other characteristics specific to their particular configuration.

The lighting device 108 can also be positioned/arranged in various ways and in various locations such as in various rooms within a home, office, or other location. In some cases, the lighting device 108 can be positioned/arranged near a media-presentation device such that the emitted light can be presented together with media content.

For example, the lighting device 108 could be positioned/arranged near the sound speaker 106 such that audio content presented via the sound speaker 106 and light emitted from the lighting device 108 can generally be presented together. In some cases, the controller 102 or another device can cause the lighting device 108 to emit light in a manner that synchronizes with or otherwise corresponds to the audio content being presented via the sound speaker 106.

As another example, the lighting device 108 could be positioned/arranged near a display screen component of a television or other the media-presentation device such that media content presented on the display screen and light emitted from the lighting device 108 can generally be presented together. In some cases, the controller 102 or another device can cause the lighting device 108 to emit light in a manner that synchronizes with or otherwise corresponds to the video content being presented via the display screen.

In some instances, the lighting system 100 can include multiple instances of at least some of the described components. The lighting system 100 and/or components thereof can take the form of a computing system, an example of which is described below.

B. Computing System

Figure 3:
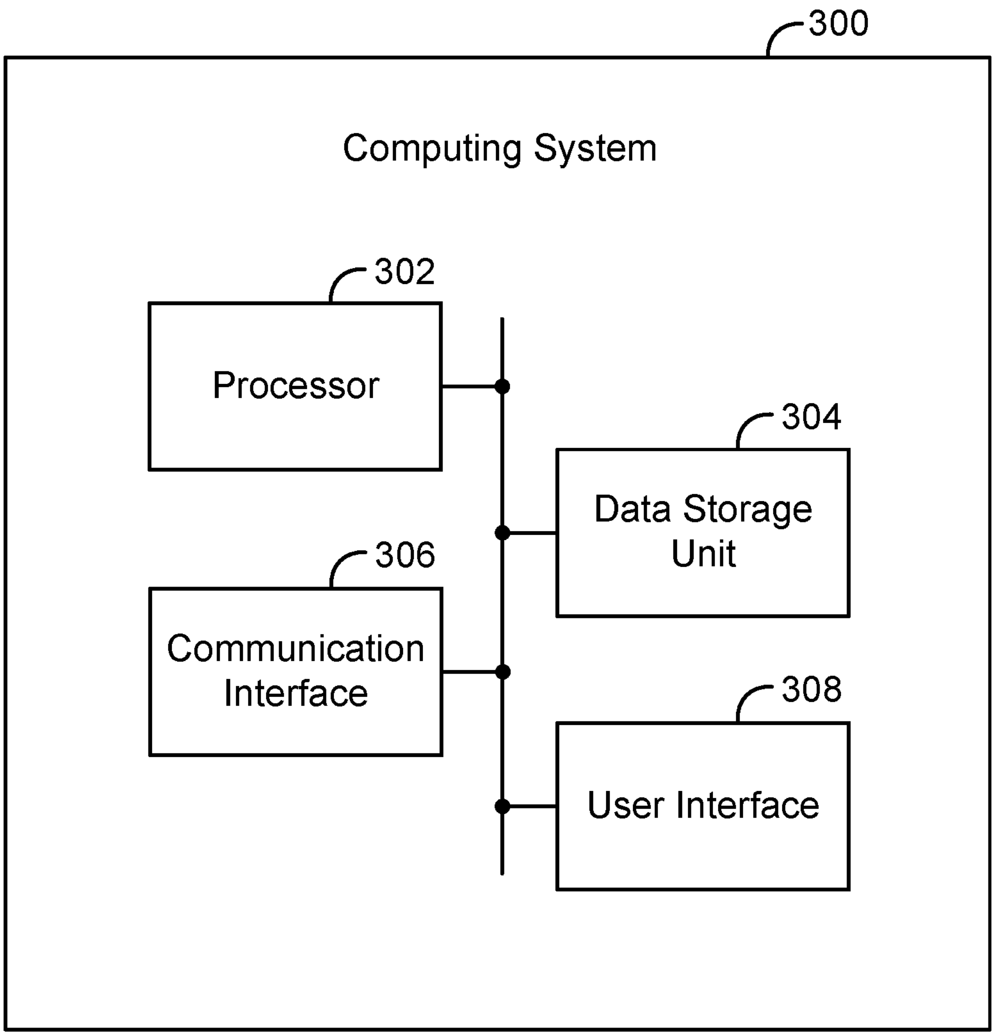
FIG. 3 is a simplified block diagram of an example computing system in which various described principles can be implemented.

FIG. 3 is a simplified block diagram of an example computing system 300. The computing system 300 can be configured to perform and/or can perform various operations, such as the operations described in this disclosure. The computing system 300 can include various components, such as a processor 302, a data storage unit 304, a communication interface 306, and/or a user interface 308.

The processor 302 can be or include a general-purpose processor (e.g., a microprocessor) and/or a special-purpose processor (e.g., a digital signal processor). The processor 302 can execute program instructions included in the data storage unit 304 as described below.

The data storage unit 304 can be or include one or more volatile, non-volatile, removable, and/or non-removable storage components, such as magnetic, optical, and/or flash storage, and/or can be integrated in whole or in part with the processor 302. Further, the data storage unit 304 can be or include a non-transitory computer-readable storage medium, having stored thereon program instructions (e.g., compiled or non-compiled program logic and/or machine code) that, upon execution by the processor 302, cause the computing system 300 and/or another computing system to perform one or more operations, such as the operations described in this disclosure. These program instructions can define, and/or be part of, a discrete software app or application.

In some instances, the computing system 300 can execute program instructions in response to receiving an input, such as an input received via the communication interface 306 and/or the user interface 308. The data storage unit 304 can also store other data, such as any of the data described in this disclosure.

The communication interface 306 can allow the computing system 300 to connect with and/or communicate with another entity according to one or more protocols. Therefore, the computing system 300 can transmit data to, and/or receive data from, one or more other entities according to one or more protocols. In one example, the communication interface 306 can be or include a wired interface, such as an Ethernet interface or a High-Definition Multimedia Interface (HDMI). In another example, the communication interface 306 can be or include a wireless interface, such as a cellular or WI-FI interface.

The user interface 308 can allow for interaction between the computing system 300 and a user of the computing system 300. As such, the user interface 308 can be or include an input component such as a keyboard, a mouse, a remote controller, a microphone, and/or a touch-sensitive panel. The user interface 308 can also be or include an output component such as a display screen (which, for example, can be combined with a touch-sensitive panel) and/or a sound speaker.

The computing system 300 can also include one or more connection mechanisms that connect various components within the computing system 300. For example, the computing system 300 can include the connection mechanisms represented by lines that connect components of the computing system 300, as shown in FIG. 3.

The computing system 300 can include one or more of the above-described components and can be configured or arranged in various ways. For example, the computing system 300 can be configured as a server and/or a client (or perhaps a cluster of servers and/or a cluster of clients) operating in one or more server-client type arrangements, such as a partially or fully cloud-based arrangement, for instance.

As noted above, the lighting system 100 and/or components of the lighting system 100 can take the form of a computing system, such as the computing system 300. In some cases, some or all of these entities can take the form of a more specific type of computing system, such as a desktop or workstation computer, a laptop, a tablet, a mobile phone, a television, a set-top box, a media player, and/or a head-mountable display device (e.g., virtual-reality headset or an augmented-reality headset), among numerous other possibilities.

III. Example Operations

The lighting system 100, the computing system 300, and/or components of either can be configured to perform and/or can perform various operations. As noted above, the lighting system 100 can perform operations related to lighting, including using an audio signal to control a lighting device. These and related operations will now be described.

To begin, the controller 102 can obtain a lighting device control instruction associated with the lighting device 108. The lighting device control instruction can specify a lighting parameter. For example, the lighting device control instruction could be an instruction to turn the light source of the lighting device 108 on, causing it to emit light, perhaps of a default color. As another example, the lighting device control instruction could be an instruction to emit light (or a specific region thereof) of a specific color and/or a specific brightness level. As another example, the lighting device control instruction could be an instruction to cause the light source to operate in a given mode (e.g., to emit light according to a given pattern or in a way that synchronizes to music, etc.).

The lighting device control instruction can configured to be suitable with the lighting device 108. For example, the lighting device control instruction can be formatted or otherwise configured in accordance with a protocol that is compatible with the lighting device 108. In some instances, the controller 102 can detect a model or type of the lighting device 108 (e.g., in connection with an initial setup or pairing process) and can then edit the lighting device control instruction in accordance with one or more predefined rules to ensure that the lighting device control instruction is compatible with the lighting device 108.

In some situations, such as where the lighting system 100 includes multiple lighting devices 108, the lighting device control instruction can be an instruction for a specific one or more of the multiple lighting devices 108. In these cases, the lighting device control instruction might specify a target lighting device by way of specifying a lighting device identifier for that lighting device, for instance.

In one example, the controller 102 obtaining instructions can involve receiving the lighting device control instruction from a user via a user interface. For instance, in the case where the controller 102 is a mobile phone, media player, television or other media presentation device running an app associated with the lighting device 108, a user can provide a lighting device control instruction via that device by adjusting one or more lighting parameters within the app.

In another example, the controller 102 obtaining the lighting device control instruction can involve extracting the lighting device control instruction from media content (e.g., from video content and/or audio content). For context, in some instances, a content provider or other entity can embed a lighting device control instruction, separate from the media data that represents the media to be presented (e.g., the video content or the audio content to be presented), but rather is dedicated solely or primarily for the purpose of controlling the lighting device 108 located in an environment near a media-presentation device (e.g., to synchronize lighting with the media content being presented). As such, upon receipt of the media content, the media-presentation device can analyze the media content, determine appropriate corresponding lighting parameters, and transmit to the controller 102 lighting device control instructions that specify those lighting parameters.

In another example, the controller 102 obtaining the lighting device control instructions can involve the controller 102 receiving them from a device (e.g., a home automation device) or generating them based on information obtained in connection with a home automation system or the like. For example, the controller 102 can be a home automation system hub or a device within a network of devices, that can operate based on one or more device states, obtained sensor data, and/or one or more automation rules. For example, the controller 102 can detect motion (e.g., based on data collected from its own motion sensor or based on a message received from a connected motion sensing device) within a room where the lighting device 108 is located and in response, the controller 102 can generate a lighting device control instruction that can be used to cause the lighting device 108 to turn on.

Next, the controller 102 can transmit the obtained lighting device control instruction to the audio encoder 104. The audio encoder 104 can obtain the lighting device control instruction, such as by receiving it from the controller 102, and can encode the obtained lighting device control instruction into an audio signal.

The audio encoder 104 can encode the obtained lighting device control instruction into the audio signal in various ways, such as by employing any audio watermarking technique now known or later discovered. As is known in the art, audio watermarking involves permanently embedding or otherwise encoding information into audio content in a manner that enables the information to be decoded and extracted from the audio content by a receiver of the media content but that may be imperceptible to a user to whom the audio content is presented.

More particularly, watermarking audio content could involve encoding into the audio content a code that can be mapped to associated information, or perhaps more directly encoding into the audio content the associated information. In an example implementation, the watermark code could be on the order of 24 bits, and the watermarking could be done in an audio signal for instance.

Existing audio watermarking techniques include, without limitation, inserting audio energy into the audio signal or otherwise adjusting one or more characteristics of the audio signal in a manner that can be detected by a suitably configured watermark-detection algorithm but that is masked from hearing (e.g., the audio characteristic and/or manner of encoding being sufficient to hide the watermark from human detection)—known as stenographic or psychoacoustic encoding.

Examples of audio watermark encoding and corresponding decoding and extraction techniques are described in U.S. Pat. No. 10,764,230 (entitled "Low latency audio watermark embedding," which issued on Sep. 1, 2020), U.S. Pat. App. Pub. No. 2018/0144755 (entitled "Method and apparatus for inserting watermark to audio signal and detecting watermark from audio signal," which published on May 24, 2018), U.S. Pat. No. 7,797,542 (entitled "Watermark signal generating apparatus," which issued on Sep. 14, 2010), and U.S. Patent App. Pub. No. 2005/0234728 (entitled "Audio content digital watermark detection," which published on Oct. 20, 2005), all of which are incorporated by reference herein.

Figure 4:
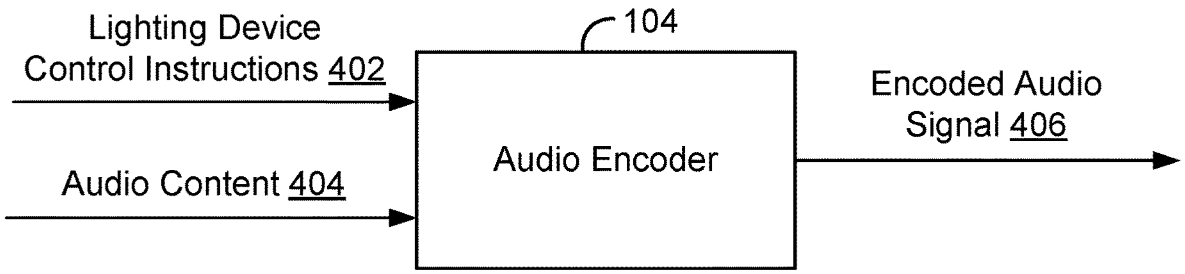
FIG. 4 is a flow diagram for an example audio encoder.

In some instances, the audio encoder 104 can generate an audio signal and can encode the lighting device control instruction into that generated audio signal. FIG. 4 is a flow diagram illustrating an example of this. As shown, lighting device control instructions 402 and audio content 404 can be provided to the audio encoder 104, which can encode the lighting device control instructions 402 into the audio content 404, thereby generating an encoded audio signal 406. The audio encoder 104 can then transmit the audio signal to the sound speaker 106, which can output the audio signal into an environment in which the lighting device 108 is located.

Next, the lighting device 108 can receive, via the microphone 204, the audio signal output by the sound speaker 106, the lighting device 108 can decode and extract the lighting device control instruction from the received audio signal, and the lighting device can use at least the extracted lighting device control instruction as a basis to control operation of the light source 206.

In one example, the lighting device control instruction can be encoded within a human inaudible frequency range of the audio signal. For instance, the lighting device control instruction can be encoded within a frequency range below around 20 Hz or above around 20 kHz. In this way, the audio signal can be used to control operation of the lighting device 108 without humans nearby being disturbed or distracted by the audio signal. However, in some examples, it may be desirable to use another frequency, perhaps even one that falls within a human audible frequency range, such as within the range between around 20 Hz and 20 kHz, for instance. In other examples, other frequency ranges/thresholds could be used, for example, frequency ranges/thresholds that also take into account the audible frequency ranges of dogs, cats, or other common pets that might also be in the environment.

In some cases, the audio signal can be one that is generated solely for the purposes of controlling the lighting device 108. However, in other examples, the audio encoder 104 can encode the lighting device control instruction into an existing audio signal (e.g., an audio signal including audio content in the form of music or an audio component of video content, such as a television program or movie, for instance). In this way, the lighting device control instruction could be embedded in an existing audio signal that is already being used in connection with outputting audio content in the environment where the lighting device 108 is located. As such, the audio signal that encodes the lightning device control instruction can encode both audio data (representing the audio content) and the lightning device control instruction. In this case, it might be desirable for the audio data to be encoded within a first frequency range of the audio signal, and for the lighting device control instruction to be encoded within a second frequency range of the audio signal, where the first frequency range of the audio signal and the second frequency range of the audio signal are non-overlapping. More particularly, it might be desirable to have the first frequency be within a human audible frequency range (e.g., between around 20 Hz and 20 kHz) and the second first frequency be within a human inaudible frequency range (e.g., below 20 Hz or above 20 kHz), such that a human in the environment at issue can hear the portion of the audio signal representing audio content of the music, television program, movie, etc., but not the portion of the audio signal that carries that lighting device control instruction. In some cases, the frequency (or available frequency range) used for encoding may be configurable. For instance, the audio encoder 104 can set the frequency to be used for this purpose based on input received from a user via a user interface of the audio encoder 104. In this way, a user could adjust the frequency to be used as desired (e.g., in response to the user determining that an initially set frequency causes discomfort for a pet or for some other reason). Similarly, the lighting device can be configured (e.g., based on input received via a user interface) such that it can receive audio signals of a given frequency.

In some instances, a lighting system 100 can include multiple lighting devices 108 located within the environment in which the sound speaker 106 outputs the audio signal. For example, consider a situation in which a home includes two rooms, namely a living room and a bedroom, where the sound speaker is located in the living room, and where the each of the living room and bedroom includes its own respective lighting device. Further consider that the rooms are close enough to each other that an audio signal output by the speaker can reach both lighting devices (i.e., the lighting device in the living room and the lighting device in the bedroom). Within this scenario, there could be a situation in which it is desirable to control one lighting device, but not the other. To allow for this, a different lighting device control instruction could be used for each lighting device, such that each device could receive the one intended for it (via that device's respective microphone), while ignoring the other.

As another option, in addition to the audio encoder 104 encoding a lighting device control instruction into the audio signal, the audio could also encode a lighting device identifier into the audio signal, where the lighting device identifier identifies the target device intended to be controlled. Returning to the example above with the living room and the bedroom, the audio signal could encode a lighting device identifier of either the living room or the bedroom, to allow just one of the lighting devices (but not the other) be controlled by way of the audio signal. In other examples, multiple lighting device identifiers could be encoded into the audio signal (to control multiple specific devices).

To allow for this functionality, the lighting device can decode and extract a lighting device identifier from the audio signal, determining a lighting device identifier of the lighting device (e.g., by looking it up in a local data storage unit, comparing the decoded and extracted lighting device identifier and the determined lighting device identifier and based on the comparing, detecting a match between the decoded and extracted lighting device identifier and the determined lighting device identifier. Then, responsive to detecting the match between decoded and extracted lighting device identifier and the determined lighting device identifier, the lighting device 108 can use at least the decoded and extracted lighting device control instruction as a basis to control operation of the light source. In these and other situations where a different lighting device control instruction is used for each lighting device, the lighting devices may or may not be paired to the controller.

Additionally or alternatively, in some instances, the lighting system 100 can include or be connected to one or more cameras, light detection and ranging (LiDAR) devices, and/or radio detection and ranging (RADAR) devices that can be configured to detect nearby presence and/or motion, for the purpose of detecting whether a person is nearby a given lighting device 108. Based on this determination, the lighting system 100 can selectively cause a certain lighting device (but perhaps not another) to operate. Thus, for example, in a case where a controller 102 (e.g., a television or media player) within the lighting system 100 includes a camera, LiDAR device, or RADAR device, the controller 102 can detect whether a person is near the lighting device 108 and responsive to detecting that, carry out the operations discussed above to use an audio signal to control that lighting device 108. In the case where no presence and/or motion is detected, the lighting system 100 can refrain from performing such operations.

With these and other example techniques disclosed herein, the lighting system 100 can control the lighting device 108 without the need to engage in a pairing process (although in some examples, the lighting system 108 could still optionally be controlled at least in part using a pairing approach). As such, in some examples, the lighting device 108 using the decoded and extracted lighting device control instruction as a basis to control operation of the light source 206 can occur without the lighting device 108 being paired to an external controller. Likewise, in the case that the lighting device 108 is configured to operate in either a pairing mode or a controlling mode, the lighting device using at least the decoded and extracted lighting device control instruction as a basis to control operation of the light source can occur while the lighting device is operating in the controlling mode.

Figure 5:
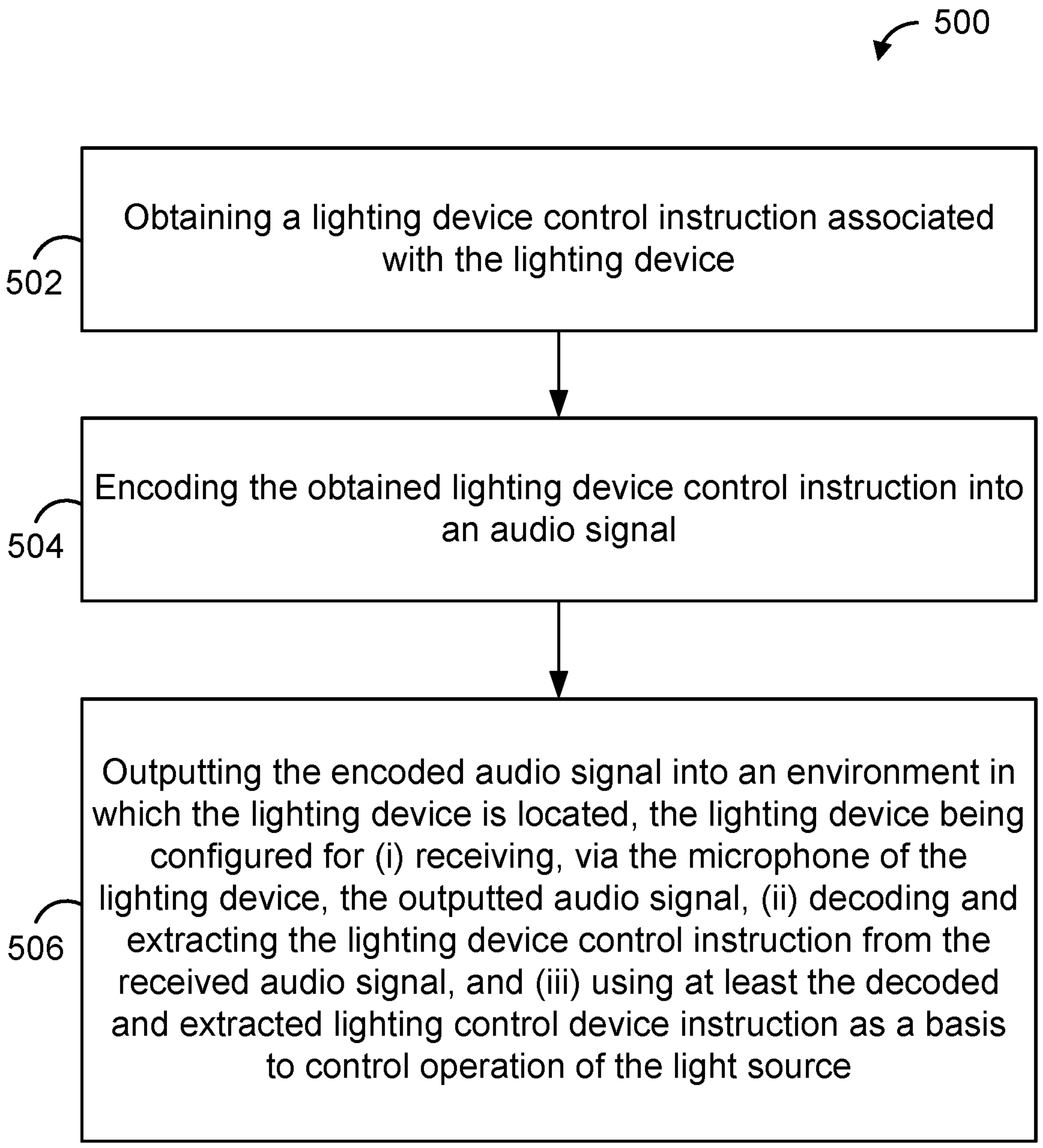
FIG. 5 is a flow chart of an example method.

FIG. 5 is a flow chart illustrating an example method 500 for use in connection with a lighting device comprising a microphone and a light source. The method 500 can be carried out by a lighting system, such as the lighting system 100, or more generally, by a computing system, such as the computing system 300. At block 502, the method 500 includes obtaining a lighting device control instruction associated with the lighting device. At block 504, the method 500 includes encoding the obtained lighting device control instruction into an audio signal. And at block 506, the method 500 includes outputting the encoded audio signal into an environment in which the lighting device is located, the lighting device being configured for (i) receiving, via the microphone of the lighting device, the outputted audio signal, (ii) decoding and extracting the lighting device control instruction from the received audio signal, and (iii) using at least the decoded and extracted lighting device control instruction as a basis to control operation of the light source.

Figure 6:
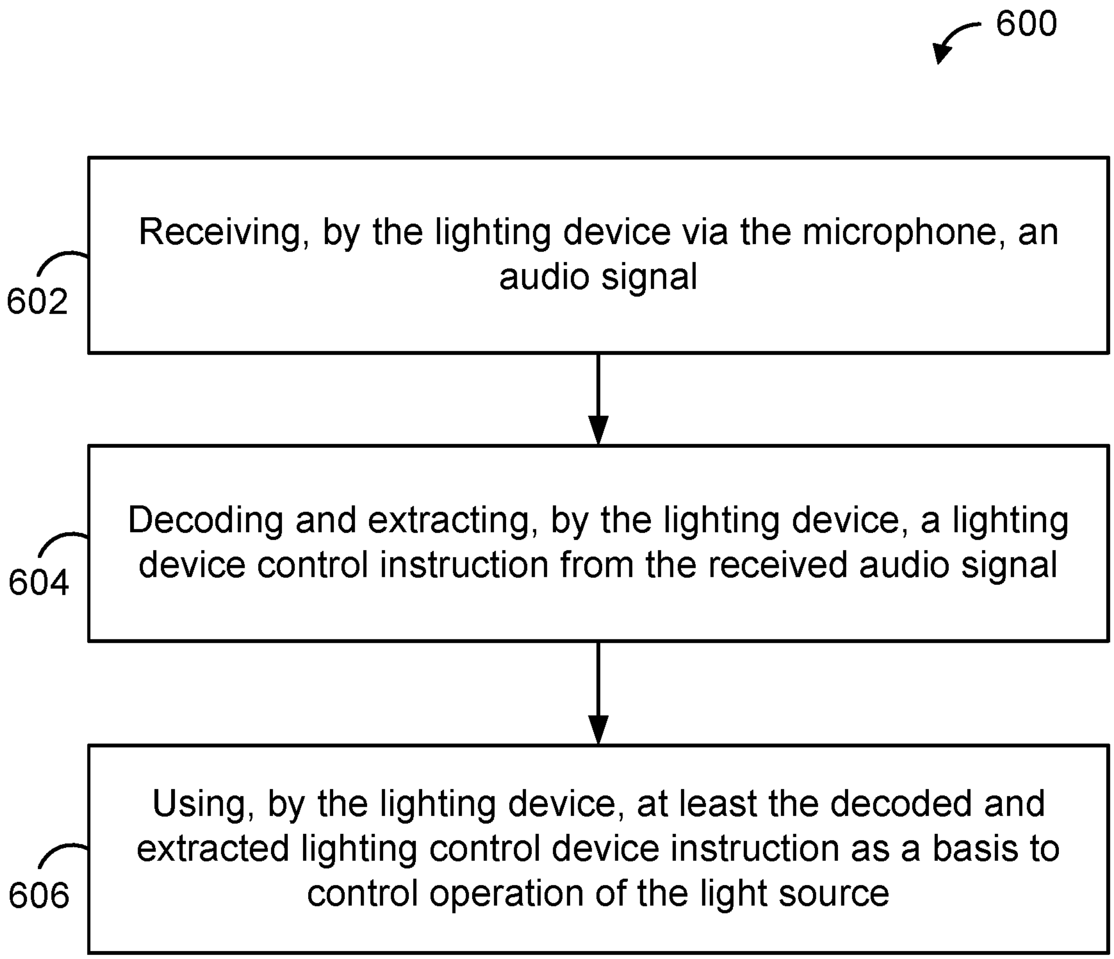
FIG. 6 is a flow chart of another example method.

FIG. 6 is a flow chart illustrating an example method 600 for use by a lighting device comprising a microphone and a light source. The method 600 can be carried out by a lighting device, such as the lighting device 108, or more generally, by a computing system, such as the computing system 300. At block 602, the method 600 includes receiving, by the lighting device via the microphone, an audio signal. At block 604, the method 600 includes decoding and extracting, by the lighting device, a lighting device control instruction from the received audio signal. And at block 606, the method 600 includes using, by the lighting device, at least the decoded and extracted lighting device control instruction as a basis to control operation of the light source.

Notably, the disclosed techniques could also be applied in the context of other types of smart home or IoT-type devices, such as electronic blinds or window shades, context, fans, media players, and smart speakers, among numerous other possibilities. In this way, various different types of control instructions (i.e., for these and other devices) could likewise be embedded in audio signals that those devices could receive, such that the devices could decode and extract the control instructions to the purpose of controlling operation of such devices.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method for use by a lighting device comprising a microphone and a light source, the method comprising:

receiving, by the lighting device via the microphone, an audio signal comprising (i) audio data representing audio content and (ii) a lighting device control instruction configured to control operation of the light source such that the light source emits light in a manner that synchronizes the emitted light with a presentation of the represented audio content via a sound speaker;

decoding and extracting, by the lighting device, a lighting device control instruction from the received audio signal; and using, by the lighting device, at least the decoded and extracted lighting device control instruction as a basis to control operation of the light source, thereby causing the light source to emit light in a manner that synchronizes the emitted light with the presentation of the represented audio content via the sound speaker;

wherein the lighting device is configured to operate in a pairing mode, wherein the lighting device is configured to operate in a controlling mode, and wherein the lighting device is configured to operate at a given time in exactly one of the pairing mode or the controlling mode, the method further comprising:

while operating in the pairing mode, detecting a model or type of the lighting device; and while operating in the controlling mode:

using one or more predefined rules associated with the detected model or type of the lighting device to edit the lighting device control instruction such that the lighting device control instruction is compatible with the lighting device.

2. The method of claim 1, wherein the lighting device control instruction is encoded in the received audio signal as a watermark.

3. The method of claim 1, wherein the lighting device control instruction specifies a lighting device identifier, wherein the method further comprises:

decoding and extracting the lighting device identifier from the audio signal;

determining a lighting device identifier of the lighting device;

comparing the decoded and extracted lighting device identifier and the determined lighting device identifier, and based on the comparing, detecting a match between the decoded and extracted lighting device identifier and the determined lighting device identifier;

responsive to detecting the match between the decoded and extracted lighting device identifier and the determined lighting device identifier, using at least the decoded and extracted lighting device control instruction as a basis to control operation of the light source.

4. The method of claim 1, wherein the audio data is encoded within a first frequency range of the audio signal, and the lighting device control instruction is encoded within a second frequency range of the audio signal, and wherein the first frequency range of the audio signal and the second frequency range of the audio signal are non-overlapping.

5. The method of claim 4, wherein the first frequency range of the audio signal is a human audible frequency range, and wherein the second frequency range of the audio signal is a human inaudible frequency range.

6. The method of claim 1, wherein the lighting device control instruction specifies a lighting parameter.

7. The method of claim 6, wherein the lighting parameter specifies a color or brightness level.

8. The method of claim 1, wherein using at least the decoded and extracted lighting device control instruction as a basis to control operation of the light source occurs without the lighting device being paired to an external controller.

9. The method of claim 1, wherein using at least the decoded and extracted lighting device control instruction as a basis to control operation of the light source occurs while the lighting device operates in the controlling mode.

10. The method of claim 1, further comprising:

detecting, using a camera, LiDAR, or RADAR device, motion of a person near the lighting device, wherein using, by the lighting device, at least the decoded and extracted lighting device control instruction as a basis to control operation of the light source comprises:

using, by the lighting device, at least (i) the decoded and extracted lighting device control instruction, and (ii) the detected motion of the person near the lighting device, as a basis to control operation of the light source.

11. A lighting device comprising a microphone and a light source, and configured to perform a set of acts comprising:

receiving, by the lighting device via the microphone, an audio signal comprising (i) audio data representing audio content and (ii) a lighting device control instruction configured to control operation of the light source such that the light source emits light in a manner that synchronizes the emitted light with a presentation of the represented audio content via a sound speaker;

decoding and extracting, by the lighting device, a lighting device control instruction from the received audio signal; and using, by the lighting device, at least the decoded and extracted lighting device control instruction as a basis to control operation of the light source, thereby causing the light source to emit light in a manner that synchronizes the emitted light with the presentation of the represented audio content via the sound speaker;

wherein the lighting device is configured to operate in a pairing mode, wherein the lighting device is configured to operate in a controlling mode, and wherein the lighting device is configured to operate at a given time in exactly one of the pairing mode or the controlling mode, the set of acts further comprising:

while operating in the pairing mode, detecting a model or type of the lighting device; and while operating in the controlling mode:

using one or more predefined rules associated with the detected model or type of the lighting device to edit the lighting device control instruction such that the lighting device control instruction is compatible with the lighting device.

12. The lighting device of claim 11, wherein the lighting device control instruction is encoded in the received audio signal as a watermark.

13. The lighting device of claim 11, wherein the lighting device control instruction specifies a lighting device identifier, and the set of acts further comprises:

decoding and extracting a lighting device identifier from the audio signal;

determining a lighting device identifier of the lighting device;

comparing the decoded and extracted lighting device identifier and the determined lighting device identifier, and based on the comparing, detecting a match between the decoded and extracted lighting device identifier and the determined lighting device identifier; and responsive to detecting the match between the decoded and extracted lighting device identifier and the determined lighting device identifier, using at least the decoded and extracted lighting device control instruction as a basis to control operation of the light source.

14. The lighting device of claim 11, wherein the audio data is encoded within a first frequency range of the audio signal, wherein the lighting device control instruction is encoded within a second frequency range of the audio signal, and wherein the first frequency range of the audio signal and the second frequency range of the audio signal are non-overlapping.

15. The lighting device of claim 14, wherein the first frequency range of the audio signal is a human audible frequency range, and wherein the second frequency range of the audio signal is a human inaudible frequency range.

16. The lighting device of claim 11, wherein the lighting device control instruction specifies a lighting parameter.

17. The lighting device of claim 16, wherein the lighting parameter specifies a color or brightness level.

18. The lighting device of claim 11, wherein using at least the decoded and extracted lighting device control instruction as a basis to control operation of the light source occurs without the lighting device being paired to an external controller.

19. The lighting device of claim 11, the set of acts further comprising:

detecting, using a camera, LiDAR, or RADAR device, motion of a person near the lighting device, wherein using, by the lighting device, at least the decoded and extracted lighting device control instruction as a basis to control operation of the light source comprises:

using, by the lighting device, at least (i) the decoded and extracted lighting device control instruction, and (ii) the detected motion of the person near the lighting device, as a basis to control operation of the light source.

20. A non-transitory computer-readable medium having stored thereon program instructions that, upon execution by a processor of a computing system, cause performance of a set of acts for use in connection with a lighting device comprising a microphone and a light source, the set of acts comprising:

receiving, by the lighting device via the microphone, an audio signal comprising (i) audio data representing audio content and (ii) a lighting device control instruction configured to control operation of the light source such that the light source emits light in a manner that synchronizes the emitted light with a presentation of the represented audio content via a sound speaker;

decoding and extracting, by the lighting device, a lighting device control instruction from the received audio signal; and using, by the lighting device, at least the decoded and extracted lighting device control instruction as a basis to control operation of the light source, thereby causing the light source to emit light in a manner that synchronizes the emitted light with the presentation of the represented audio content via the sound speaker;

wherein the lighting device is configured to operate in a pairing mode, wherein the lighting device is configured to operate in a controlling mode, and wherein the lighting device is configured to operate at a given time in exactly one of the pairing mode or the controlling mode, the set of acts further comprising:

while operating in the pairing mode, detecting a model or type of the lighting device; and while operating in the controlling mode:

using one or more predefined rules associated with the detected model or type of the lighting device to edit the lighting device control instruction such that the lighting device control instruction is compatible with the lighting device.

21. The non-transitory computer-readable medium of claim 20, the set of acts further comprising:

detecting, using a camera, LiDAR, or RADAR device, motion of a person near the lighting device, wherein using, by the lighting device, at least the decoded and extracted lighting device control instruction as a basis to control operation of the light source comprises:

using, by the lighting device, at least (i) the decoded and extracted lighting device control instruction, and (ii) the detected motion of the person near the lighting device, as a basis to control operation of the light source.

* * * * *